(12) United States Patent
Sharma et al.

(10) Patent No.: US 9,336,375 B1
(45) Date of Patent: May 10, 2016

(54) RESTRICTING ACCESS TO DATA ON PORTABLE STORAGE MEDIA BASED ON ACCESS TO A PRIVATE INTRANET

(75) Inventors: Sanjay K. Sharma, Olathe, KS (US); Woojae Lee, Manhattan, KS (US)

(73) Assignee: SPrint Communications Company L.P., Overland Park, KS (US)

( * ) Notice: Subject to any disclaimer, the term of this patent is extended or adjusted under 35 U.S.C. 154(b) by 1125 days.

(21) Appl. No.: 12/510,788

(22) Filed: Jul. 28, 2009

(51) Int. Cl.
| | |
|---|---|
| G06F 7/04 | (2006.01) |
| G06F 21/35 | (2013.01) |
| G06F 21/34 | (2013.01) |
| G06F 21/52 | (2013.01) |
| H04L 29/06 | (2006.01) |

(52) U.S. Cl.
CPC ............ G06F 21/35 (2013.01); G06F 21/34 (2013.01); G06F 21/52 (2013.01); H04L 63/10 (2013.01)

(58) Field of Classification Search
CPC ......... G06F 21/34; G06F 21/35; G06F 21/52; H04L 63/10
USPC .............................................................. 726/4
See application file for complete search history.

(56) References Cited

U.S. PATENT DOCUMENTS

| | | | | |
|---|---|---|---|---|
| 7,080,154 | B1 * | 7/2006 | Inoue ................... | H04L 69/329 379/93.01 |
| 7,631,195 | B1 * | 12/2009 | Yu et al. ........................ | 713/189 |
| 7,853,783 | B2 * | 12/2010 | Bin et al. ...................... | 713/153 |
| 8,281,384 | B2 * | 10/2012 | Sim et al. ....................... | 726/11 |
| 8,412,837 | B1 * | 4/2013 | Emigh ...................... | H04L 9/30 705/65 |
| 2003/0046366 | A1 * | 3/2003 | Pardikar et al. ............... | 709/219 |
| 2003/0079121 | A1 * | 4/2003 | Gilman ............... | H04L 12/4641 713/153 |
| 2004/0052378 | A1 * | 3/2004 | Shiragami et al. ............ | 380/277 |
| 2004/0123113 | A1 * | 6/2004 | Mathiassen ........... | B60R 25/252 713/185 |
| 2004/0233039 | A1 * | 11/2004 | Beenau et al. ................ | 340/5.83 |
| 2005/0055560 | A1 * | 3/2005 | Kendon ................ | G06F 19/322 713/189 |
| 2006/0090074 | A1 * | 4/2006 | Matoba .......................... | 713/171 |
| 2006/0230264 | A1 * | 10/2006 | Catherman et al. ........... | 713/155 |
| 2007/0055834 | A1 * | 3/2007 | Malkin .......................... | 711/162 |
| 2007/0158408 | A1 * | 7/2007 | Wang et al. .................... | 235/380 |
| 2007/0250709 | A1 * | 10/2007 | Bailey, Jr. ...................... | 713/168 |
| 2008/0005426 | A1 * | 1/2008 | Bacastow ................ | G06F 21/78 710/62 |
| 2008/0082813 | A1 * | 4/2008 | Chow et al. ........................ | 713/2 |
| 2008/0172336 | A1 * | 7/2008 | Srinivasan ........................ | 705/51 |
| 2009/0010503 | A1 * | 1/2009 | Mathiassen ........... | B60R 25/252 382/125 |
| 2009/0049268 | A1 * | 2/2009 | Kim et al. ...................... | 711/170 |
| 2010/0177896 | A1 * | 7/2010 | Walter et al. .................. | 380/270 |
| 2010/0199016 | A1 * | 8/2010 | Paulos ................. | H05K 5/0278 710/313 |
| 2010/0217871 | A1 * | 8/2010 | Gammon ....................... | 709/227 |
| 2010/0250796 | A1 * | 9/2010 | Jevans et al. .................... | 710/36 |

OTHER PUBLICATIONS

Eye-Fl Pro 4GB Wireless SDHC Card; 2009; 2 Pages.

* cited by examiner

Primary Examiner — Techane Gergiso

(57) ABSTRACT

Systems, products, and methods are disclosed for enabling access to encrypted data stored on a portable storage medium. In one embodiment, an attempt to communicate with a certain intranet is made. If this attempt succeeds, then access is granted to the data stored on the portable storage device, but if access to the intranet is not granted, then access to the data stored on the portable storage device is also not granted. Denying access can include preventing the portable storage device from even being recognized by a requesting device, being recognized but not presented, or can include showing that such encrypted data exists, but denying access to the data in an unencrypted format.

20 Claims, 5 Drawing Sheets

RESTRICTING ACCESS TO DATA ON PORTABLE STORAGE MEDIA BASED ON ACCESS TO A PRIVATE INTRANET

SUMMARY

Embodiments of the invention are defined by the claims below, not this summary. A high-level overview of various aspects of the invention are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, ways of limiting access to data stored on a portable storage device such as a USB drive or other media card. According to some embodiments, access to such data is limited only when the device has access to a prescribed private intranet.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
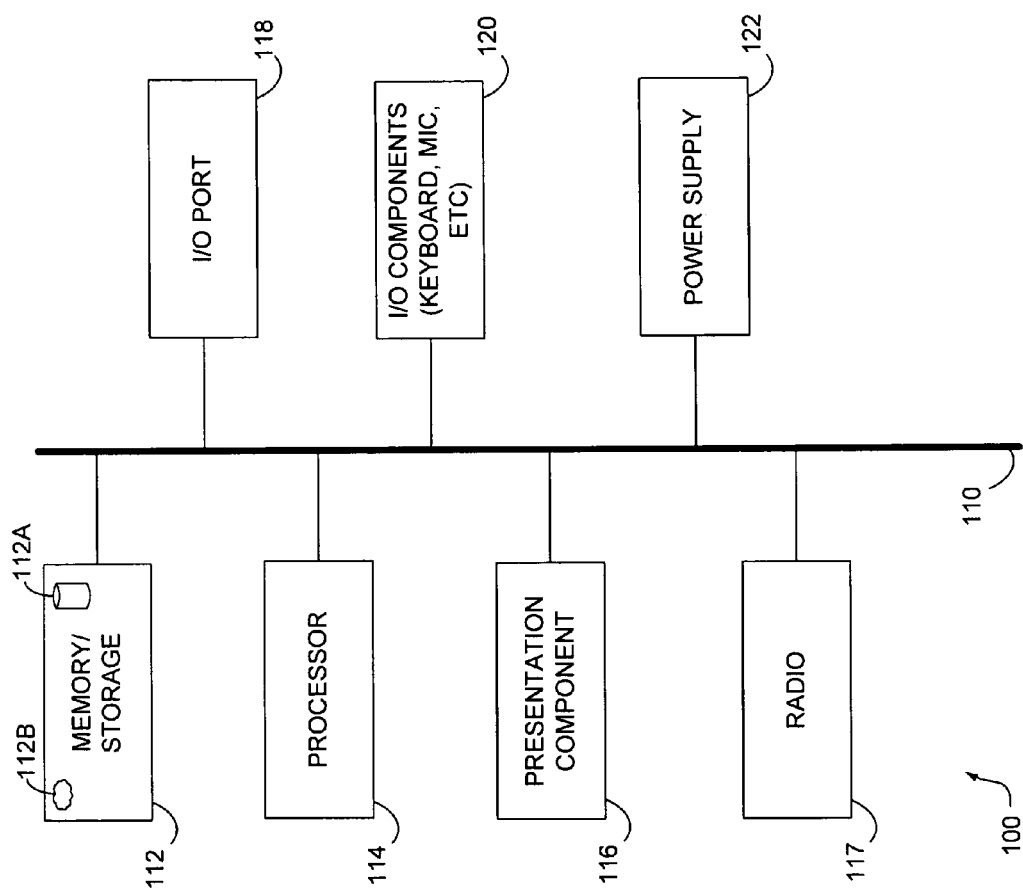
FIG. 1 depicts an illustrative device suitable for use in connection with an embodiment of the present invention.

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

AAA Authentication, Authorization, and Accounting
AES Advanced Encryption Standard
BSID Base-Station Identifier
BTS Base Transceiver Station/Base Station
CDMA Code Division Multiple Access
DES Data Encryption Standard
FA Foreign Agent
GGSN GPRS Gateway Support Node
GPRS General Packet Radio Service
GSM Global System for Mobile communications (Groupe Special Mobile)
IDEA International Data Encryption Algorithm
IP Internet Protocol
LED Light Emitting Diode
MIP Mobile IP
NAI Network Address Identifier
PDA Personal Data Assistant
PDSN Packet Data Serving Node
SD Secure Digital
SEAL Software-Optimized-Encryption Algorithm
SGSN Serving GPRS Support Node
TDMA Time division multiple access
UMTS Universal Mobile Telecommunications System Further, various technical terms are used throughout this description. An illustrative resource that fleshes out various aspects of these terms can be found in Newton's Telecom Dictionary by H. Newton, 24th Edition (2008).

Embodiments of the present invention may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Turning now to FIG. 1, a block diagram of an illustrative electronics device (variously referred to herein as a "host" or "requesting device") is provided and referenced generally by the numeral 100. Although some components are shown in the singular, they may be plural. For example, host device 100 might include multiple processors or multiple radios, etc. As illustratively shown, host device 100 includes a bus 110 that directly or indirectly couples various components together including memory 112 (a form of computer-readable media), a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). It can include a host application 112B, which takes the form of embodied computer-executable instructions that facilitate various aspects of embodiments of the invention. Processor 114 might actually be multiple processors that receive instructions and process them accordingly. Presentation component 116 includes the likes of a display, a speaker, as well as other components that can present information (such as a lamp (LED), or even lighted keyboards).

Radio 117 represents a radio that facilitates communication with a wireless telecommunications network. Illustrative wireless telecommunications technologies include CDMA, GPRS, TDMA, GSM, and the like. In some embodiments, radio 117 might also facilitate other types of wireless communications including Wi-Fi, Bluetooth®, and Near Field Communications (NFC).

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into host device 100. Power supply 122 includes items such as batteries, fuel cells, or any other component that can act as a power source to power host device 100.

Figure 2:
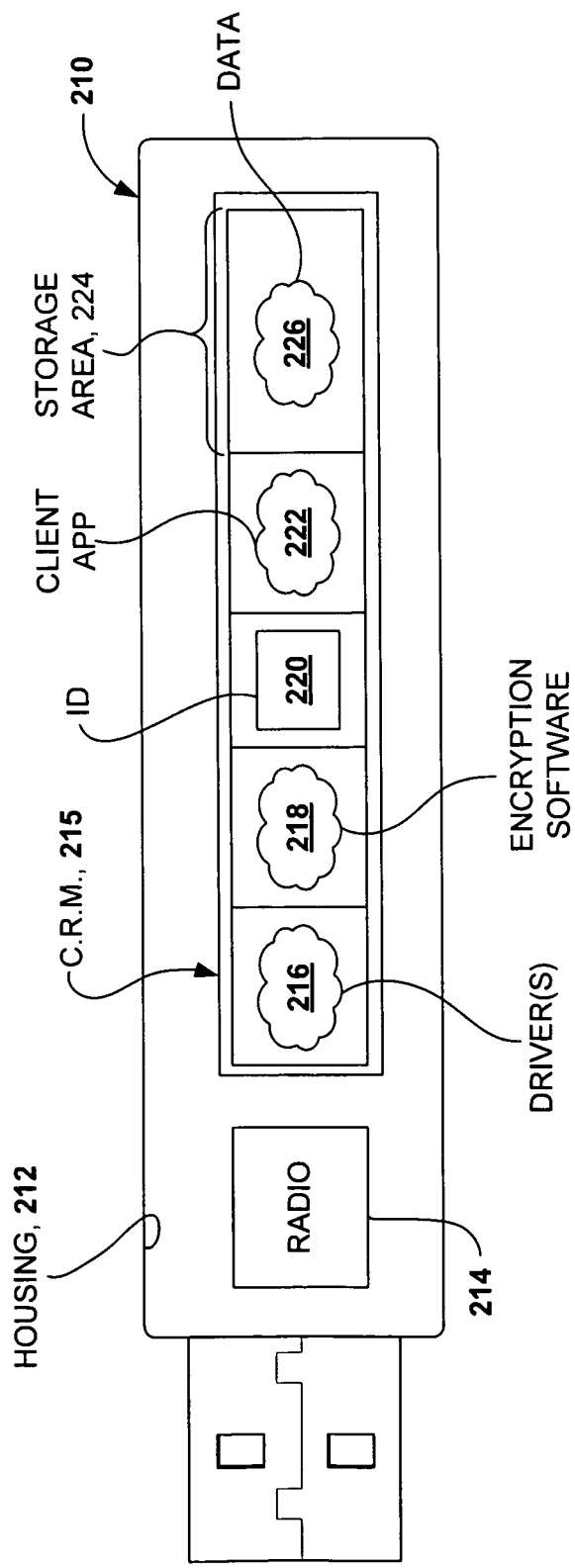
FIG. 2 depicts an illustrative portable storage device according to an embodiment of the present invention.

Turning now to FIG. 2, an illustrative portable storage device is depicted and referenced generally by the numeral 210. Although portable storage device 210 is illustratively shown in the context of a USB drive, we do so for readability and not by way of limitation. As will be explained, portable storage device 210 can take many forms, including, for example, a Secure Digital (SD) card (or variation thereof such as mini or micro SD), compact flash, and an array of others.

In one embodiment, portable storage device 210 includes a housing 212 that houses various components, some of which are shown in FIG. 2. In some embodiments, portable storage device 210 includes a radio 214, which facilitates direct communication with another wireless device. That is, radio 214 might allow, for example, Wi-Fi communication with a wireless router. By way of further example, radio 214 might enable Bluetooth® as well as NFC communications.

Portable storage device 210 also includes computer-readable media 215, which can include a variety of components such as one or more drivers 216, encryption software 218, an identifier 220, a client application 222, and data 226, which can take the form of encrypted data or unencrypted data if certain conditions are met.

Some operating systems require drivers to facilitate communication between the host device and portable storage device. Thus, if applicable, one or more drivers 216 are present so as to enable communication between portable storage device 210 and a host device that hosts portable storage device 210. Some electronic devices do not require drivers. In those situations, drivers 216 will not be utilized.

Portable storage device 210 also includes encryption software 218 in one embodiment. Encryption software 218 allows for the encryption of data 226 so that it exists in a protected form. Various algorithms to facilitate data encryption can be employed. A few illustrative algorithms include the Data Encryption Standard (DES), Advanced Encryption Standard (AES), Blowfish, RSA, International Data Encryption Algorithm (IDEA), Software-Optimized-Encryption Algorithm (SEAL), or RC4. These illustrative encryption algorithms mentioned do not form an exhaustive list; but rather illustrate exemplary algorithms that could be used to encrypt data 226.

Identifier 220 identifies portable storage device 210. It, as with other components depicted in FIG. 2, might not be present or form a part of portable storage device 210. But in some embodiments, identifier 220 is included to enable portable storage device 210 to be identified. Identifier 220 can take the form of a string of characters in one embodiment.

Client application 222 includes a set of computer-executable instructions that facilitate various aspects of the present invention. By way of example, client application 222 interacts with host application 112B to exchange data between a host device and portable storage device 210. Moreover, other functionality that client application 222 provides is an ability to inspect a list of wireless networks that it or a hosting device has permission to access. Moreover, client application 222 facilitates receiving requests and responding to requests for access to data 226. Additional details regarding functional attributes of client application 222 will be provided below.

Although we show computer-readable media 215 as though it is partitioned, this may not be the actual case. That is, the different components might exist together in unsegregated space. But in other embodiments certain portions of computer-readable media 215 might be allocable for specific information. Thus, by way of illustration and not limitation, we depict an illustrative storage area 224 that can be used to store data 226. The amount of data that can be stored on portable storage device 210 can be vast. For example, several gigabytes can currently be stored on a portable storage device, and that number will certainly increase. Thus, storage area 224 might store several gigabytes of information. It should be clear that no sort of scale is intended to be depicted in FIG. 2. The amount of space consumed by the drivers, encryption software, identifier, and client application might be on the order of kilobytes or megabytes, for example. By default, data 226 exists in an encrypted format in some embodiments. It is exposed in an unencrypted format when certain conditions are met; namely, when a private intranet is accessible either directly or indirectly by portable storage device 210.

Figure 3:
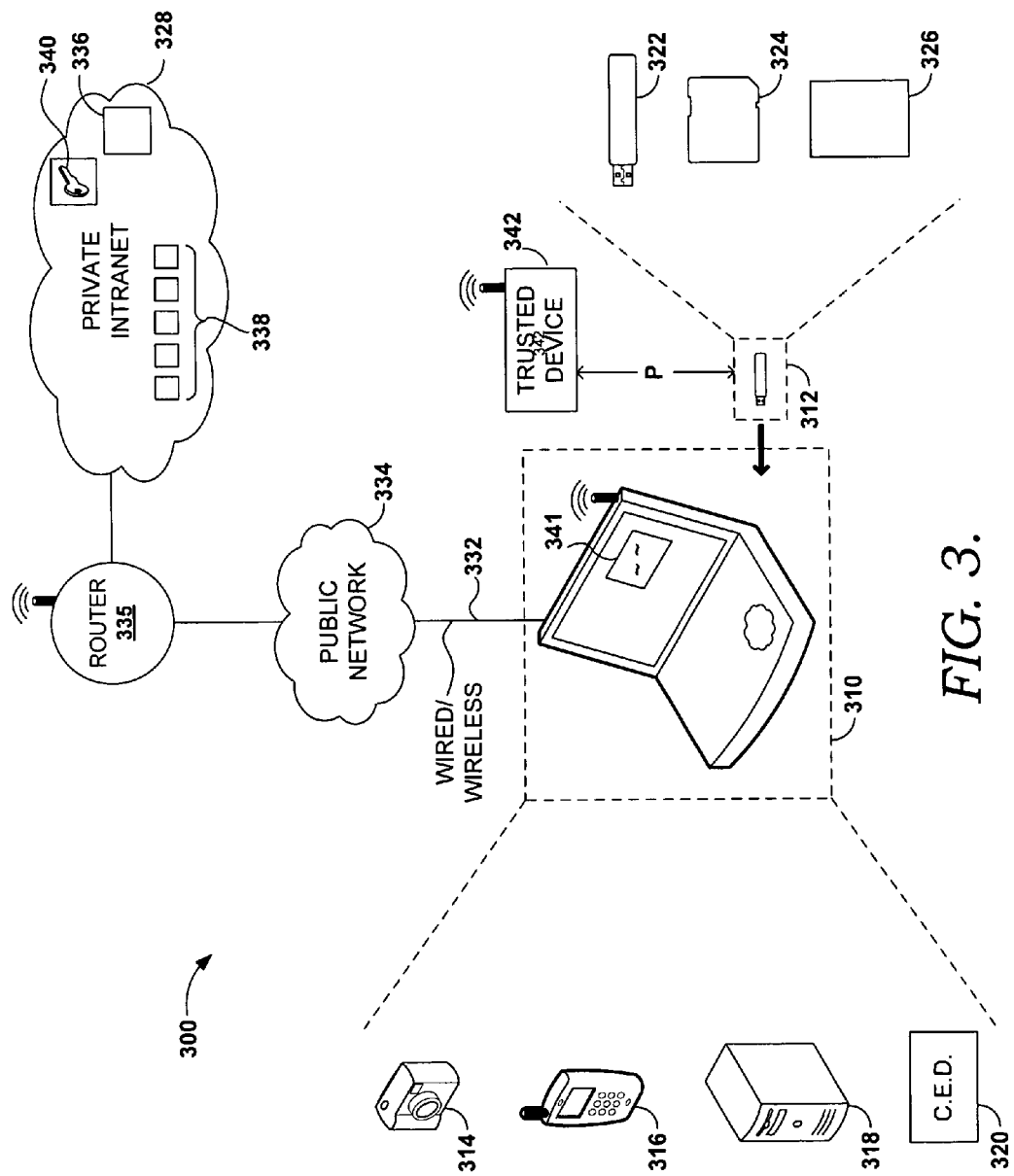
FIG. 3 depicts an illustrative operating environment suitable for practicing an embodiment of the present invention.

Turning now to FIG. 3, an illustrative operating environment suitable for practicing an embodiment of the present invention is provided and referenced generally by the numeral 300. Operating environment 300 includes a host device 310. Host device 310 might take the form of a computing device such as a laptop computer that is shown, but also might take the form of a camera 314; mobile device 316 such as a cell phone, server computer or other 318; or other consumer electronics device 320. Host device 310 can be any device that is capable of communicating with portable storage device 312. Portable storage device 312 can also take on a variety of formats consistent with that of FIG. 2; namely, for example, a USB drive 322, an SD card 324, a compact flash card 326, or other. In discussing FIG. 3 as well as various methods of limiting access to the data on a portable storage device, we will reference FIG. 2 and sometimes FIG. 1 as well. Thus, although some components are given unique reference numerals, we do so to help make this document more readable rather than to necessarily indicate that devices are different. Thus, what is labeled as portable storage device 312 might also be the same as portable storage device 210 in some embodiments.

Host device 310 (or in some embodiments even portable storage device 312 directly) might have access to a private intranet 328. When it does, data 226 will be available in an unencrypted format. Generally, intranet 328 will be accessible by host device 310 by way of a pathway 332 (which can be wired or wireless), a public network 334, and a router 335. Although we use the singular for readability, we do not mean to indicate that only one device that we mention at a given time is necessarily used. For example, several routers might provide access to intranet 328.

As mentioned, pathway 332 can be wired or wireless. Still further, in some embodiments, host device 310 can communicate directly with router 335, which communication might be wireless communication. It might even be the case that portable storage device 312, equipped with a radio such as radio 214, might be able to communicate directly with router 335 via Wi-Fi or some other wireless-communications technology. An exemplary public network 334 includes the intranet.

Router 335 is a network device that directs or limits traffic to or from various computing devices. Given the right security credentials, it will provide access to intranet 328. It will also broadcast signals in some embodiments that, if certain security credentials are provided, will provide access to intranet 328.

Intranet 328 can include an array of network devices; far too many to exhaustively describe herein. It might be an elaborate network with many hundreds or thousands of computing devices or a relatively simple network with only a few or even one computing device. By way of example, several computing devices 338 might be part of intranet 328. These devices normally receive IP addresses. Thus, an IP range can be associated with intranet 328. A specific computing device 336 can form part of intranet 328. We refer to a specific computing device 336 mainly for the purpose of being able to refer to a device that can perform various functions associated with embodiments of the present invention. It or a different computing device might provide a key 340 that is usable by portable storage device 312 to allow access to data 226 in an unencrypted format.

Host device 310 can include an application that manages wireless-network connections. This application can assemble a list 341 of available wireless networks. As will be explained, in some embodiments, if intranet 328 is included in list 341, then this will be a sufficient criteria that will enable access to data 226 in an unencrypted format.

In some embodiments, a trusted device 342 is used in connection with granting access to data 226. More particularly, if portable storage device 312 is within a sufficient threshold proximity P, then access will be allowed to data 226. An illustrative example of this embodiment would include one in which a permanently mounted or other device is in a location such that if portable storage device 312 is brought within threshold proximity P to the trusted device 342, then access will be granted to data 226. By way of example, consider a company that would like to limit access to data on USB drives that it provides. A limitation might be that the drives can only be used on the company's premises or nearby. Again, by way of illustration, various trusted devices 342 could be placed throughout strategic locations of a company's physical structure. Then, by way of Bluetooth® communications or NFC, or other short-range protocols, access to data 226 on portable storage device 312 will be granted only when it recognizes the presence of trusted device 342, which can happen without user intervention.

Similarly, if an entity wishes to limit the use of portable storage device 210 such that access to data 226 is allowed only when intranet 328 is accessible, then such is possible utilizing our technology described herein. Thus, an illustrative use case would include that in which a corporation (or any organization) wishes to allow its employees and only its employees to access data on certain USB drives. Operating under the premise that only employees can access intranet 328, client application 222 includes instructions that limit access to data 226 only when intranet 328 is accessible by portable storage device 312. This access might be direct or indirect.

In the case of direct access, portable storage device 312 includes a radio that facilitates direct communication with a device such as wireless router 335. If circumstances exist such that intranet 328 is accessible by portable storage device 312, then data 226 will be exposed to a requesting entity.

Portable storage device 312 might have indirect access to intranet 328. In this situation, another device such as host device 310 is used in connection with portable storage device 312 to gain access to intranet 328. There are many ways that portable storage device 312 can receive an indication that it has access to intranet 328. By way of example, an attempt can be made to access one or more computing devices associated with one or a range of IP addresses that form a portion of intranet 328. By way of example, intranet 328 might have a set of IP addresses allocated to be used in connection with addressing components that make up intranet 328. If any one of those IP addresses is reachable by portable storage device 312, then it will know that it has access to intranet 328. Thus, perhaps it attempts to access one of computing devices 338, or a specific computing device 336. If it is able to access one of these computing devices, then it will know that it has access to intranet 328. In another embodiment, client application 222 can attempt to request that it be assigned an IP address within a prescribed range; mainly, the range associated with intranet 328. Thus, if it is able to be assigned such an address, then it will know that it has access to intranet 328. Care could be taken to ensure that such an IP address range is unique. In some situations, IP addresses behind private firewalls or routers are capable of being given the same address. For example, there might be several hundreds or thousands of network devices that have the IP address of 192.168.1.1 because this is a common range to start with. But, no two components will have that address coupled with the IP address of a public router, which router 335 might be. Thus, in one embodiment, both IP addresses can be evaluated.

As mentioned, another way that portable storage device 312 can be made aware that it has access to intranet 328 is for two attempts to reach a specific computing device, such as computing device 336. It might accomplish this in a variety of ways. One way it might try to determine whether it has access to computing device 336 is to submit a ping request. If a positive response is received, then portable storage device 312 knows that it has access to intranet 328. It might try to log into a web page associated with computing device 336 (or any other computing device; wherein logging into the web page itself serves as a measure of whether intranet 328 is accessible). Portable storage device 312 might attempt to access an application that is hosted on device 336; one in which access can only be provided to if the requesting device has access to intranet 328. Still further, an attempt can be made to access a certain network domain that forms a portion of the intranet. An illustrative domain might take the form of secure.company.com. Not all public computers might have access to such a domain. But if a computer does have access to that domain, then it will be known to have access to intranet 328. Similarly, if a certain URL is capable of being resolved, then that would indicate access to intranet 328.

Still another way of determining whether intranet 328 is accessible is to receive a validation of log-in credentials that were submitted to a web page in which the log-in credentials are required to access the intranet. Thus, perhaps a web-based application runs on intranet 328. If this application is configured such that a log-in is required and the only people that can log in are those that have access to the intranet, then a positive indication that a log-in was successful would indicate that access is provided to intranet 328.

Although there are many other ways to determine whether a private intranet 328 is reachable by portable storage device 312, a final illustrative example includes the reception of a key 340. In this case, operating environment 300 can be set up such that the only way to receive key 340 is from a computing device within intranet 328. Thus, if client application 222 requests or is otherwise provided with key 340, then such can be deemed conclusive proof that it has access to intranet 328. In some embodiments, key 340 is persistently updated and changed. In those situations, collaboration might be done with other computing devices to ensure that the key received is a valid key.

To recapitulate, our technology contemplates restricting access to data on a portable storage device unless that device has access to a given private intranet. Although we have disclosed various ways in which a determination can be made as to whether the private intranet is accessible, it is accessibility to this intranet that we are using as a check as to whether to grant access to data stored on the portable storage device. Thus, we, of course, are not merely describing receiving a key incident to a key request. Nor are we merely describing other examples. Rather, we are describing a technology that contemplates determining whether a portable storage device has access to a private intranet before it exposes its contents to a requesting device.

Figure 4:
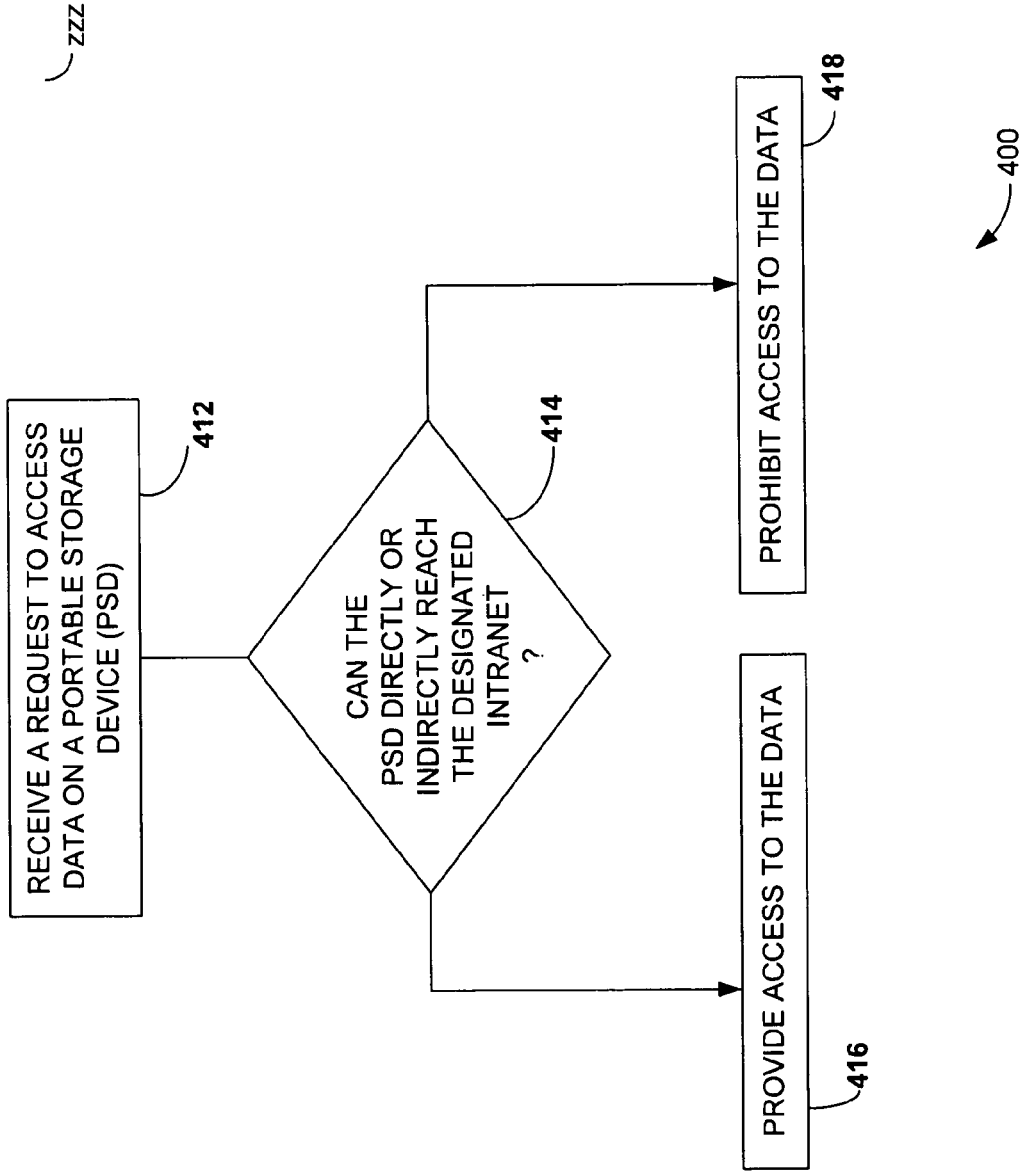
FIGS. 4-5 depict illustrative flows consistent with a method for enabling access to encrypted data stored on a portable storage medium according to embodiments of the present invention.

Turning now to FIG. 4, an illustrative method for enabling access to encrypted data stored on a portable storage medium is provided and referenced generally by the numeral 400. At a step 412, portable storage device 312 receives a request to access data on it. In one embodiment, this includes receiving a request from a host device such as host device 310, which can take the form of those items listed on FIG. 3 (314-320).

At a step 414, a determination is made as to whether the portable storage device can directly or indirectly reach a designated intranet. We have previously described various ways of determining whether the personal storage device has access to the designated intranet. If the portable storage device does have access to the designated intranet, then access is provided to the data at a step 416, but if access cannot be had to the designated intranet, then access to the data stored on the portable storage device is prohibited at a step 418.

Figure 5:
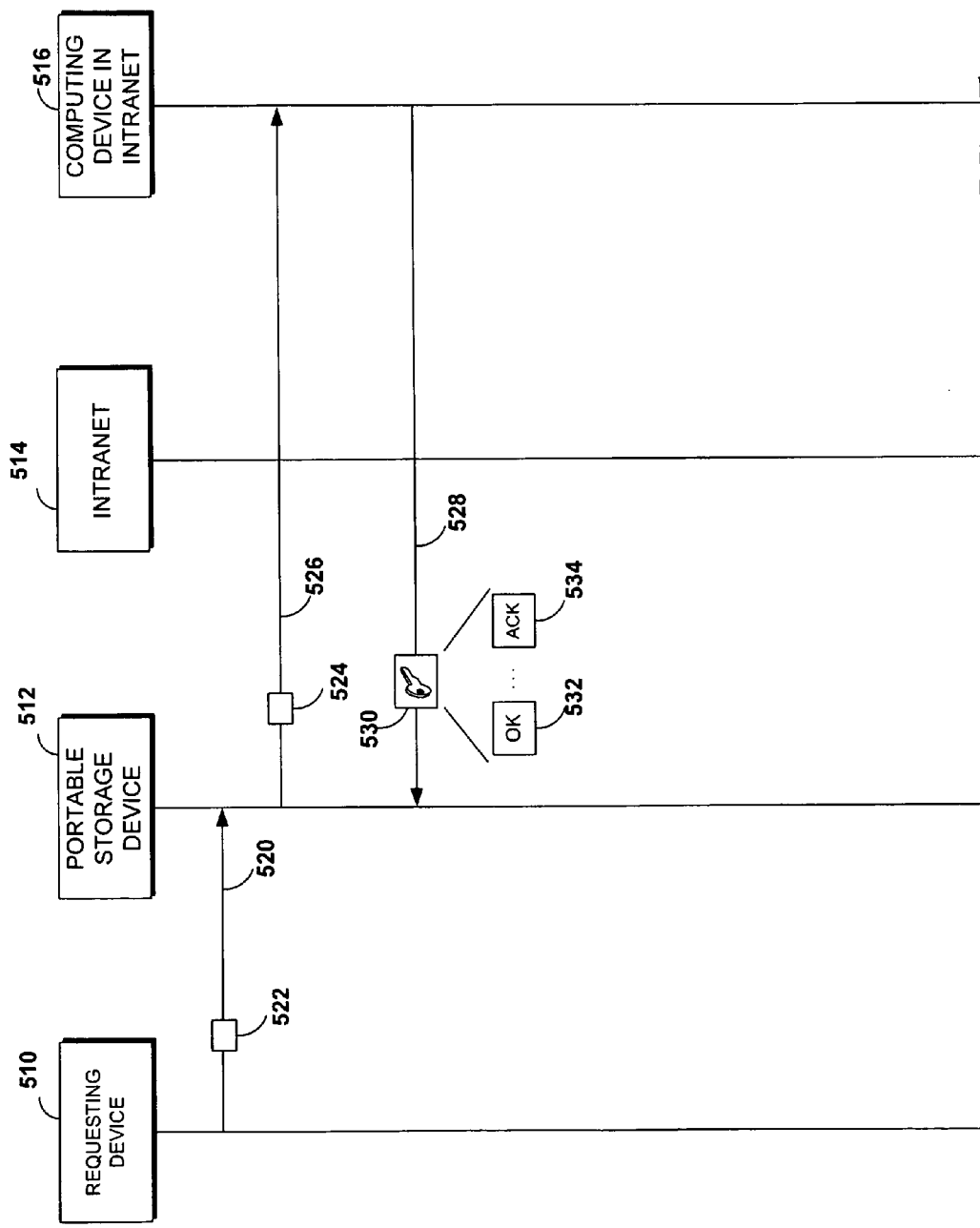

Turning now to FIG. 5, an illustrative data-flow diagram is provided that illustrates a method of managing access to data stored on a portable storage device. FIG. 5 includes representations of a requesting device 510, a portable storage device 512, an intranet 514, and a computing device that is in the intranet 516. We have previously described these devices, and thus will only provide a high-level overview of each in this section. Requesting device 510 can be any device that requests information such as data 226 from portable storage device 512. The requesting device might take the form of a consumer electronics device or any other device that attempts to access data stored on the portable storage device 512.

Portable storage device 512 can be of the type depicted in FIG. 2.

Intranet 514 is similar to intranet 328 of FIG. 3. Namely, it is a private network that is only accessible by authorized entities. Computing device 516 is one that resides within intranet 514.

According to one embodiment, at a step 520, a request 522 is made from requesting device 510 to portable storage device 512 for access to data 226 stored on it. In one embodiment, client application 222 facilitates submitting a request 524 at a step 526 to determine whether portable storage device 512 has access to intranet 514. If it does, it will actually be able to travel through intranet 514 and access computing device 516 that is within intranet 514. What it receives back at a step 528 can take on a variety of formats, including a key 530 (variously referred to as "response 530" because it does not need to be a key), as well as an "Okay" indication 532 or an acknowledgment 534, both of which indicate a successful validation in some context of one or more security credentials.

Response 530 might also take the form of a properly resolved web page that was able to be resolved as a result of being able to access computing device 516. In this case, request 524 might have been a URL of a specific website. In some embodiments, response 530 is delivered directly to portable storage device 512. In other embodiments, response 530 is actually provided to portable storage device 512 by way of requesting device 510 (not shown).

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. A method of enabling access to encrypted data stored on a portable storage medium, the method comprising:
attempting, by the portable storage medium, to communicate with an intranet, wherein the portable storage medium includes a radio configured to communicate directly with the intranet using a wireless communications network independent of a host device to determine if the intranet is a predetermined private intranet;
receiving a request at the host device to access the encrypted data stored on the portable storage medium;
determining, by the portable storage medium using the radio, that the intranet is the predetermined private intranet that, when identified by the portable storage medium as the predetermined private intranet, allows access to the encrypted data by the host device; and
providing the host device access to the encrypted data stored on the portable storage medium in an unencrypted form.

2. The method of claim 1, wherein the predetermined private intranet is identified by the portable storage medium prior to the request to access the encrypted data.

3. The method of claim 1, wherein attempting to communicate with the intranet includes one or more of the following:
attempting to access one or more computing devices associated with one or a range of IP addresses that form a portion of the intranet;
attempting to access a website via a specific Uniform Resource Locator that is only accessible by way of the intranet;
attempting to access a certain network domain that forms a portion of the intranet;
submitting to a given web page log-in credentials that are required to access the intranet; and
receiving a key that is provided via a computing device that forms a portion of the intranet.

4. The method of claim 3, wherein the predetermined private intranet is accessible by the portable storage medium when one or more of the following occur:
the one or more computing devices associated with one or a range of Internet Protocol addresses are reached;
the website is accessible via the specific Uniform Resource Locator;
the certain network domain is accessed;
the log-in credentials are validated; and
the key is received.

5. The method of claim 2, further comprising attempting to ping a first computing device that forms a portion of the intranet.

6. The method of claim 1, wherein the communication with the intranet is successful when the portable storage medium is permitted to access a prescribed wireless network that provides access to the intranet.

7. The method of claim 6, wherein the host device is permitted to access the prescribed wireless network when the prescribed wireless network is listed in a list of accessible wireless networks on the host device.

8. The method of claim 1, wherein the portable storage medium includes a device identifier that identifies the portable storage medium.

9. The method of claim 1, wherein the communication with the intranet is successful when a computing device within the intranet uses a device identifier associated with the portable storage medium to confirm that the portable storage medium is authorized to decrypt the encrypted data.

10. A memory component comprising:
   a housing having a portable computer-readable medium that stores encrypted data in a first portion of the portable computer-readable medium;
   a radio configured to communicate directly with an accessible intranet using a wireless communications network to determine if the accessible intranet is a predetermined private intranet; and
   a set of computer-executable instructions embodied on a second portion of the portable computer-readable medium, wherein the computer-executable instructions, when executed, perform a process that includes permitting access to the encrypted data in an unencrypted form only when it is determined, at the portable computer-readable medium using the radio, that the predetermined private intranet that allows access to the encrypted data is accessible by the portable computer-readable medium.

11. The memory component of claim 10, wherein it is further determined that a specified trusted source is within a threshold proximity of the memory component and includes an electronics device that is communicated with by way of a short-range wireless technology.

12. The memory component of claim 11, wherein the short-range wireless technology includes Near Fields Communications (NFC) technology.

13. The memory component of claim 10, wherein the predetermined private intranet is capable of being accessed when any of the following are successful:
   an attempt to access one or more computing devices associated with one or a range of IP addresses that form a portion of the predetermined private intranet;
   an attempt to access a website via a specific Uniform Resource Locator (URL) that is only accessible by way of the predetermined private intranet;
   an attempt to ping a first computing device that forms a portion of the predetermined private intranet;
   attempting to access a certain network domain that forms a portion of the predetermined private intranet;
   a validation of log-in credentials submitted to a web page, wherein the log-in credentials are required to access the predetermined private intranet; and
   receiving a key that is provided via a computing device that forms a portion of the predetermined private intranet.

14. A method of enabling access to encrypted data stored on a portable storage medium, the portable storage medium having a radio configured to communicate with an accessible intranet using a wireless communications network, the method comprising:
   receiving, from a requesting device, a request to access unencrypted data, which is the encrypted data in an unencrypted format stored on the portable storage medium;
   attempting, by the portable storage medium using the radio, to communicate directly with the accessible intranet to determine if the accessible intranet is a predetermined private intranet, connection to which by the portable storage medium allows access to the encrypted data by the requesting device;
   determining, by the portable storage medium, whether the accessible intranet is the predetermined private intranet that allows access to the encrypted data by the requesting device; and
   if the predetermined private intranet is accessible by the portable storage medium using the radio, then providing access to the unencrypted data, but
   if the predetermined private intranet is not accessible by the portable storage medium using the radio, then preventing access to the unencrypted data.

15. The method of claim 14, wherein determining whether the predetermined private intranet is accessible by the portable storage medium includes attempting to access one or more computing devices associated with one or a range of IP addresses that form a portion of the predetermined private intranet.

16. The method of claim 14, wherein determining whether the predetermined private intranet is accessible by the portable storage medium includes attempting to access a website via a specific Uniform Resource Locator that is only accessible by way of the predetermined private intranet.

17. The method of claim 14, wherein determining whether the predetermined private intranet is accessible by the portable storage medium includes attempting to ping a first computing device that forms a portion of the predetermined private intranet.

18. The method of claim 14, wherein determining whether the predetermined private intranet is accessible by the portable storage medium includes attempting to access a certain network domain that forms a portion of the predetermined private intranet.

19. The method of claim 14, wherein determining whether the predetermined private intranet is accessible by the portable storage medium includes receiving a key that is provided via a computing device that forms a portion of the predetermined private intranet.

20. The method of claim 14, wherein preventing access to the unencrypted data includes one or more of:
   not presenting to the requesting device a representation of the portable storage medium;
   presenting a representation of the portable storage medium to the receiving device without presenting an indication of the unencrypted data nor the encrypted data; and
   presenting a representation of the portable storage medium to the receiving device and a representation of the encrypted data, without decrypting the encrypted data.

* * * * *